(12) United States Patent
Takada

(10) Patent No.: US 7,265,789 B2
(45) Date of Patent: Sep. 4, 2007

(54) CAMERA WITH FLANGE BACK ADJUSTING MECHANISM

(75) Inventor: Noboru Takada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1014 days.

(21) Appl. No.: 10/381,287

(22) PCT Filed: Dec. 5, 2001

(86) PCT No.: PCT/JP01/10644

§ 371 (c)(1),
(2), (4) Date: Mar. 21, 2003

(87) PCT Pub. No.: WO02/47376

PCT Pub. Date: Jun. 13, 2002

(65) Prior Publication Data

US 2004/0027458 A1 Feb. 12, 2004

(30) Foreign Application Priority Data

Dec. 7, 2000 (JP) ............................ 2000-373037

(51) Int. Cl.
*H04N 5/225* (2006.01)
*H04N 5/232* (2006.01)

(52) U.S. Cl. .................. 348/374; 348/345; 396/83

(58) Field of Classification Search ................ 348/345, 348/374, 335, 340; 396/61, 79, 83, 82; 359/819
See application file for complete search history.

(56) References Cited

U.S. PATENT DOCUMENTS

| | | | | | |
|---|---|---|---|---|---|
| 5,005,948 | A | * | 4/1991 | Takahashi et al. | 359/819 |
| 5,333,024 | A | * | 7/1994 | Labaziewicz | 396/79 |
| 5,400,073 | A | * | 3/1995 | Morioka et al. | 348/335 |
| 5,739,853 | A | * | 4/1998 | Takahashi | 348/335 |
| 5,825,559 | A | * | 10/1998 | Johnson et al. | 359/819 |
| 6,349,172 | B1 | * | 2/2002 | Tanaka et al. | 396/61 |
| 6,351,288 | B1 | * | 2/2002 | Johnson et al. | 348/373 |
| 6,683,654 | B1 | * | 1/2004 | Haijima | 348/374 |
| 6,867,812 | B2 | * | 3/2005 | Iizumi et al. | 348/374 |

FOREIGN PATENT DOCUMENTS

| | | |
|---|---|---|
| JP | 62-168471 | 7/1987 |
| JP | 2-111175 | 4/1990 |
| JP | 7-8021 | 1/1995 |
| JP | 7-95452 | 4/1995 |

(Continued)

OTHER PUBLICATIONS

Patent Abstracts of Japan, Imaki Koji, "Flange-Back Adjusting Mechanism For Video Camera", Publication No. 62168471, Publication Date: Jul. 24, 1987, 1 page.

(Continued)

*Primary Examiner*—Lin Ye
(74) *Attorney, Agent, or Firm*—Pearne & Gordon LLP

(57) ABSTRACT

A camera includes a flange back adjusting mechanism in which the operation of the flange back adjusting mechanism is not obstructed, and the flange back adjustment is easily performed. A flange back adjusting mechanism which moves and adjusts a CCD in the direction of the optical axis can be operated by an operation section which protrudes to the outside of a case portion through an operation window. The operation window is opened in a side wall face of a camera chassis separating rearward from a lens mount portion along the direction of the optical axis and on a peripheral wall of a case portion of the camera chassis.

2 Claims, 6 Drawing Sheets

FOREIGN PATENT DOCUMENTS

| | | |
|---|---|---|
| JP | 11-308518 | 11/1999 |
| JP | 2000-165733 | 6/2000 |

OTHER PUBLICATIONS

Patent Abstracts of Japan, Totsuka Tomohiro, "Video Camera", Publication No. 07095452, Publication Date: Apr. 7, 1995, 1 page.

Patent Abstracts of Japan, Haijima Hideki, "Video Camera", Publication No. 11308518, Publication Date: Nov. 5, 1999, 1 page.

Patent Abstracts of Japan, Takahashi Koichiro, "Flange Back Adjusting Mechanism", Publication No. 2000165733, Publication Date: Jun. 16, 2000, 1 page.

* cited by examiner

CAMERA WITH FLANGE BACK ADJUSTING MECHANISM

TECHNICAL FIELD

The present invention relates to a camera with a flange back adjusting mechanism which includes a flange back adjusting mechanism that moves and adjusts a device holder for holding a solid state imaging device such as a CCD, in the direction of the optical axis of a lens, and more particularly to an improvement to facilitate an operation of a flange back adjustment, thereby enhancing handleability.

BACKGROUND ART

FIGS. 6 and 7 show a conventional art example of a camera with a flange back adjusting mechanism which is used as, for example, a television camera or a video camera.

The illustrated camera with a flange back adjusting mechanism is disclosed in JP-B-7-8021, and includes: a camera chassis 5 having a lens mount portion 3 to which a lens is to be mounted and a case portion 4 which is rearward continuous to the lens mount portion 3; a device holder 9 which is supported by the camera chassis 5 so as to be movable in the vicinity of the imaging position of the lens mounted to the lens mount portion 3 and along the optical axis 7 of the lens; a CCD (charge-coupled device) 11 serving as a solid state imaging device which is held on the optical axis of the lens by the device holder 9 and which converts an incident optical signal into an electric signal and outputs the electric signal; and a flange back adjusting mechanism 13 which moves and adjusts the position of the device holder 9 in the direction of the optical axis of the lens.

In this example, the lens mount portion 3 is formed separately from the case portion 4. The lens mount portion 3 has a substantially cylindrical shape, and includes a front escutcheon 3a which is formed integrally with the periphery of the mount portion. Four corners of the escutcheon 3a are fastened to a front face of the case portion 4 by screw members 15, whereby the mount is coupled and fixed to the case portion 4.

The device holder 9 has a rectangular recess 9a into which the CCD 11 is fitted. The periphery of the CCD 11 which is fitted into the recess 9a is pressed by a device pressing plate 17 which is screwed to a front face of the device holder 9 in order to attain a state where the CCD is fixed to the device holder 9.

The device holder 9 is fixed to a chassis attaching bracket 19 by screw members 18. The bracket 19 is supported so as to be movable in the direction of the optical axis of the lens between a front wall 4a of the case portion 4 and the lens mount portion 3. The bracket 19 is urged toward the lens mount portion 3 by springs 21 which are inserted in a compressed state between the bracket and the front wall 4a of the case portion 4.

In the flange back adjusting mechanism 13, a stopper portion 23a which butts against a front end portion of the bracket 19 that is urged by the springs 21 in order to perform positioning of the bracket 19 in the direction of the optical axis, and a cam portion 23b which gives a displacement of the lens in the direction of the optical axis are disposed on a cam ring 23 which is fitted onto an outer periphery of the lens mount portion 3.

The cam ring 23 is fitted onto the outer periphery of the lens mount portion 3 in such a manner that the ring is rotatable and movable along the direction of the optical axis of the lens.

The cam portion 23b is an inclined face which is formed on an inner peripheral face of the cam ring 23 so as to, from the side of the bracket 19, butt against protrusions 25 disposed on the outer periphery of the lens mount portion 3. When the cam ring 23 is rotated to change the contact positions between the protrusions 25 and the cam portion 23b, the cam ring 23 is moved on the lens mount portion 3 in the direction of the optical axis of the lens, and the bracket 19 which is driven by the cam ring 23 is displaced to adjust the position of the device holder 9 in the direction of the optical axis.

In the thus configured camera 1, dispersion of the flange back distance is performed by checking an image on a polymeter which receives an output of the CCD 11. In the case where dispersion of the flange back causes the CCD 11 to be deviated from the imaging position of the lens, the flange back is adjusted while observing a screen of the polymeter.

DISCLOSURE OF THE INVENTION

In the conventional camera 1 described above, the flange back is adjusted by gripping the outer periphery of the cam ring 23 and then rotating the cam ring 23.

In a television camera or a video camera, recently, a large aperture lens which is larger in outer diameter than the cam ring 23 is sometimes used as an interchangeable lens 27 which is to be mounted to the lens mount portion 3 as shown in FIG. 8. In such a case, the cam ring 23 which hides in a valley portion behind the interchangeable lens 27 is hardly rotated by fingers, thereby finally producing a problem in that it is difficult to conduct the operation of adjusting the flange back.

The invention has been conducted in view of these circumstances. It is an object of the invention to provide a camera with a flange back adjusting mechanism in which, even when a large aperture interchangeable lens is mounted to a lens mount portion, the operation of the flange back adjusting mechanism is not obstructed, and the flange back adjustment is easily performed to provide excellent handleability.

In order to attain the object, the camera with a flange back adjusting mechanism of the invention is a camera with a flange back adjusting mechanism including: a camera chassis having a lens mount portion; a device holder which is supported by the camera chassis to be movable in a vicinity of an imaging position of a lens and in a direction of an optical axis; a solid state imaging device which is held by the device holder; and a flange back adjusting mechanism which moves and adjusts the device holder in the direction of the optical axis, wherein the flange back adjusting mechanism includes: a cam ring which is supported to be rotatable about the optical axis in the camera chassis and in which a cam surface is disposed in a peripheral edge portion, a projection length of the cam surface in the direction of the optical axis being gradually changed in a circumferential direction; a positioning protrusion which protrudes from the device holder, a tip end of the protrusion butting against the cam surface; a holder urging spring which urges the device holder toward the cam ring to maintain a state where the positioning protrusion butts against the cam surface; an operation window which is opened in a side wall face of the camera chassis, the side wall face extending along the direction of the optical axis; and a ring driving mechanism which rotates the cam ring by an operation section that protrudes to an outside through the operation window.

According to the configuration, the operation section of the flange back adjusting mechanism for moving the device holder is placed on the side wall face of the camera chassis which is rearward separated from the lens mount portion. Even when an interchangeable lens of a large aperture is mounted to the lens mount portion, therefore, the operation section does not hide in a valley portion behind the interchangeable lens.

In the camera with a flange back adjusting mechanism, preferably, the ring driving mechanism is configured to rotate a driving gear which meshes with the cam ring by the operation section, and includes an elastic member which applies to the driving gear a load that blocks rotation of the driving gear when a rotation operating force is equal to or smaller than a reference.

According to the configuration, the load which is applied to the driving gear by the elastic member exerts a braking function which prevents rattling of the driving gear and the operation section due to backlash in a gear train used in the flange back adjusting mechanism, from occurring, thereby preventing an error due to rattling from being produced in transmission of the operating force.

Figure 1:
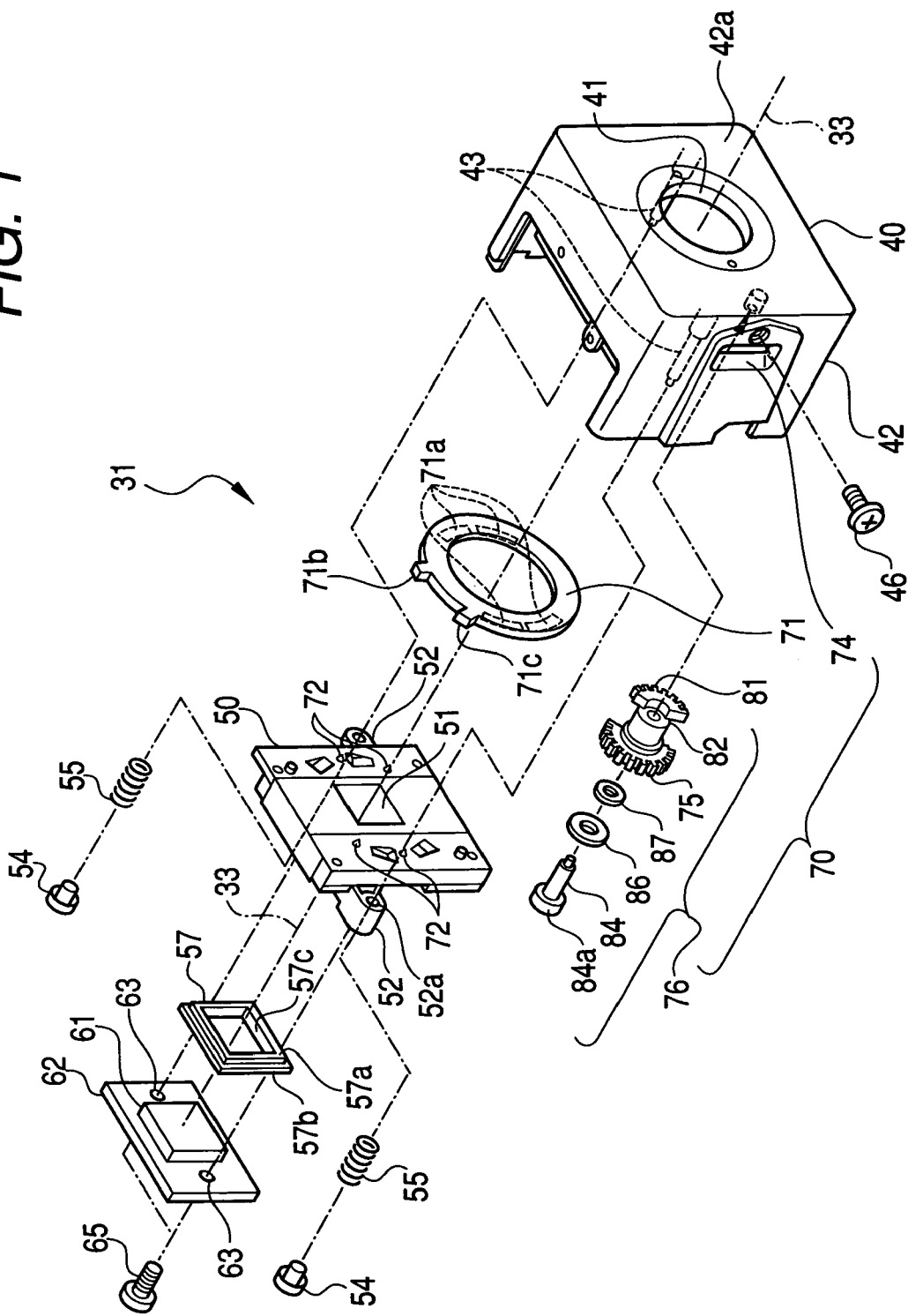
FIG. 1 is an exploded perspective view of main portions of an embodiment of the camera with a flange back adjusting mechanism of the invention.

In the reference numerals in the figures, 31 denotes a camera with a flange back adjusting mechanism, 40 denotes a camera chassis, 41 denotes a lens mount portion, 42 denotes a case portion, 50 denotes a device holder, 55 denotes a holder urging spring, 61 denotes a CCD. (solid state imaging device), 62 denotes a base plate, 70 denotes a flange back adjusting mechanism, 71 denotes a cam ring, 71a denotes cam surfaces, 71b and 71c denote rotation limiting pieces, 71d denotes a gear, 72 denotes positioning protrusions, 74 denotes an operation window, 75 denotes an operation section, 76 denotes a ring driving mechanism, and 81 denotes a driving gear.

BEST MODE FOR CARRYING OUT THE INVENTION

Hereinafter, a preferred embodiment of the camera with a flange back adjusting mechanism of the invention will be described in detail with reference to the drawings.

Figure 2:
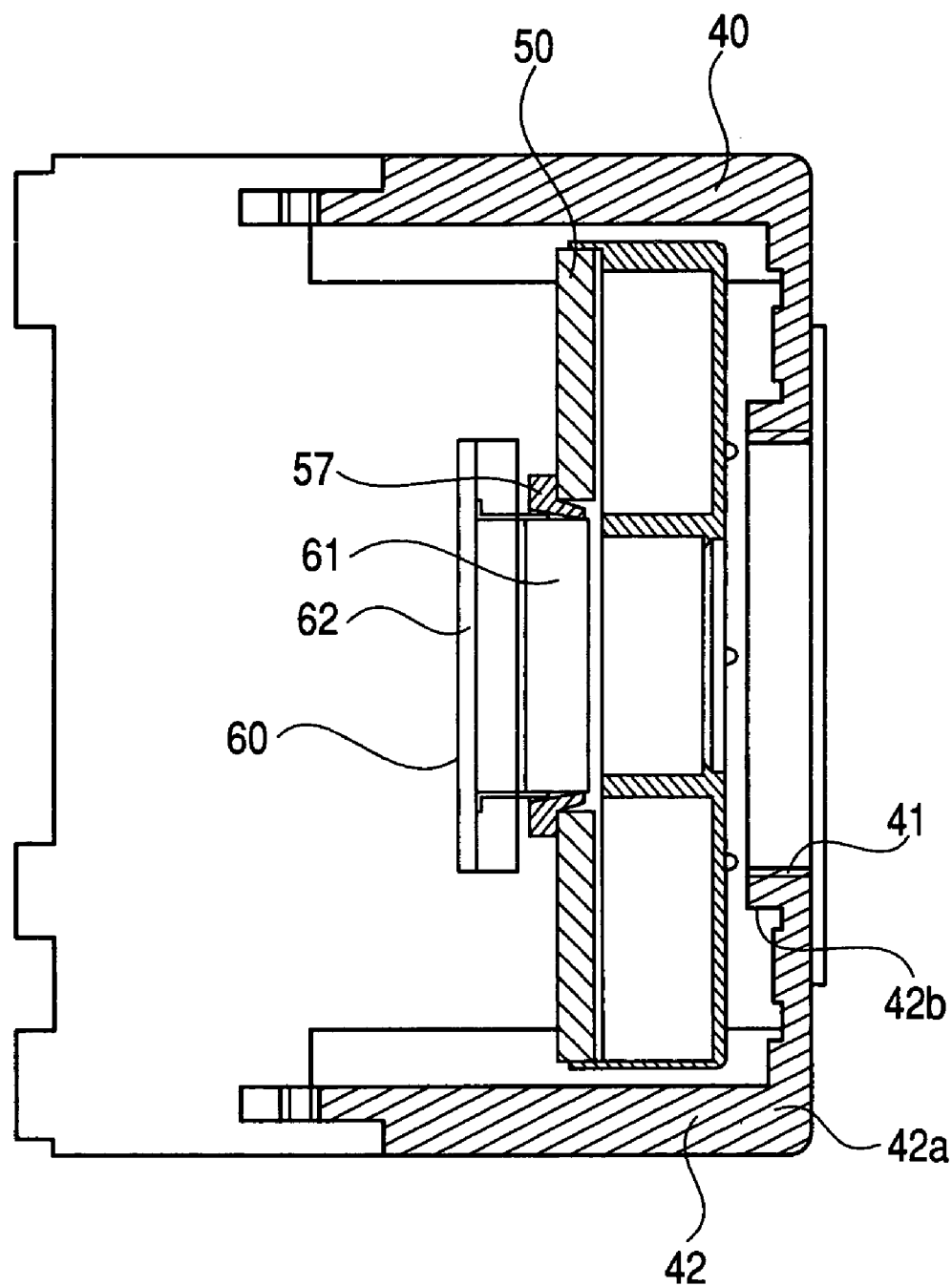
FIG. 2 is a longitudinal section view showing a state where a solid state imaging device shown in FIG. 1 is attached to a device holder.
Figure 3:
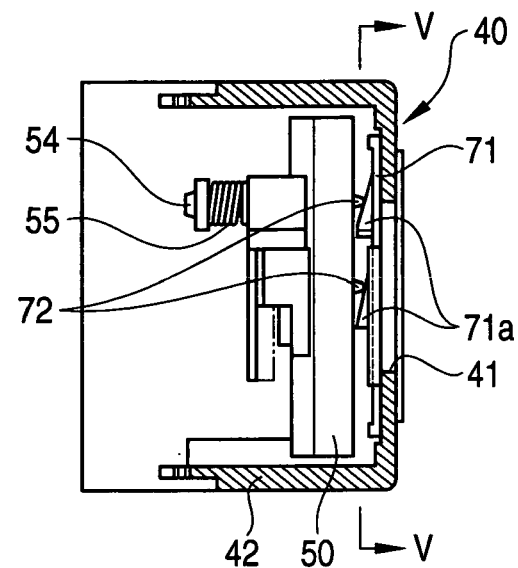
FIG. 3 is a longitudinal section view of a state where components of the camera with a flange back adjusting mechanism shown in FIG. 1 are assembled.
Figure 4:
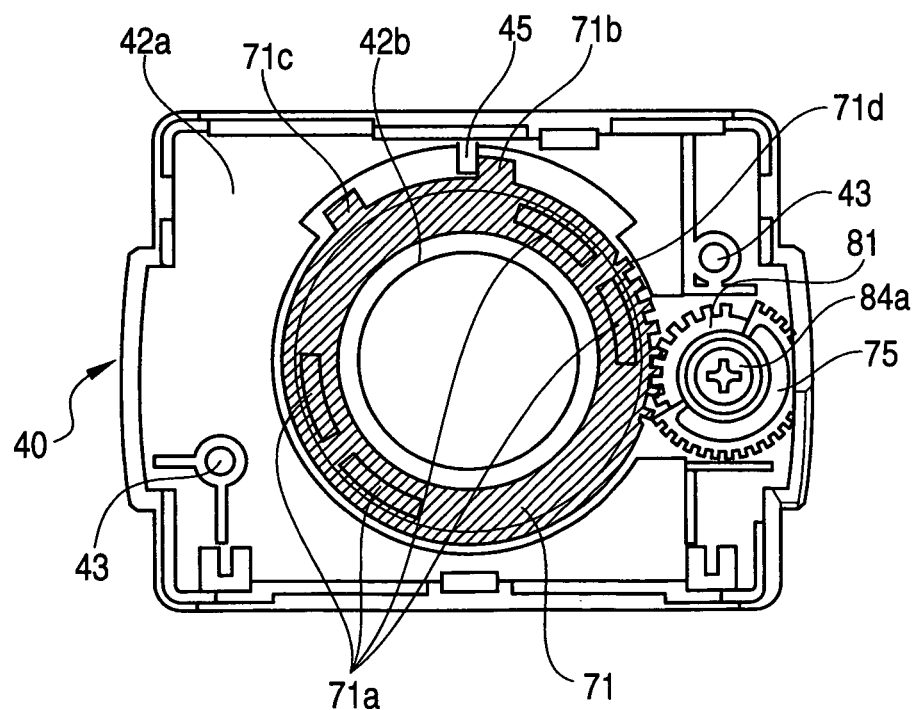
FIG. 4 is a section view taken along the line V-V of FIG. 3, looking in the direction of the arrows.
Figure 5:
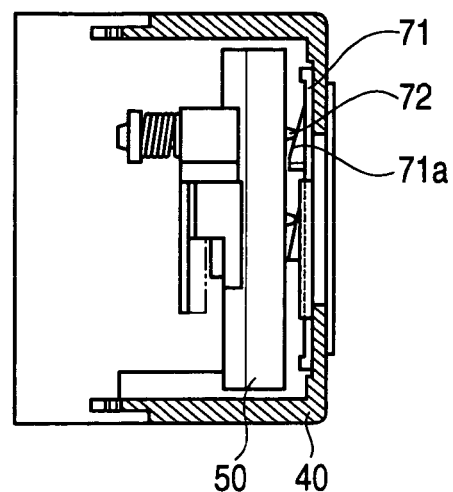
FIG. 5 shows the position of the device holder in accordance with an operation of a flange back adjustment, (a) is a longitudinal section view of a state where the solid state imaging device slightly approaches a lens mount portion, (b) is a longitudinal section view of a state where the solid state imaging device approaches the lens mount portion to the maximum, and (c) is a longitudinal section view of a state where the solid state imaging device separates from the lens mount portion to the maximum.
Figure 5:
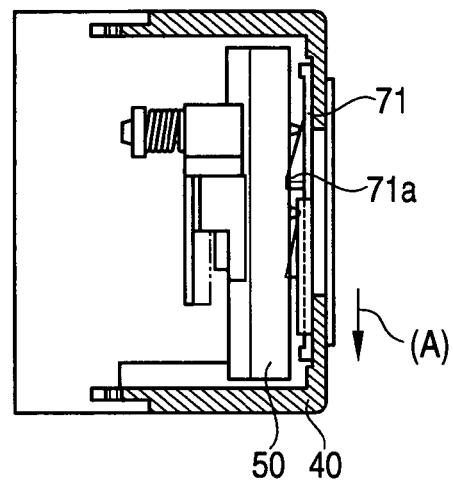
Figure 5:
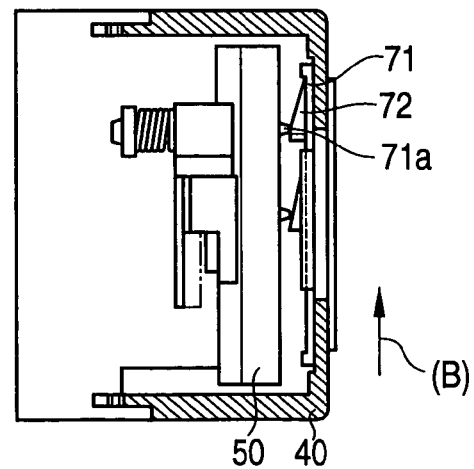
Figure 6:
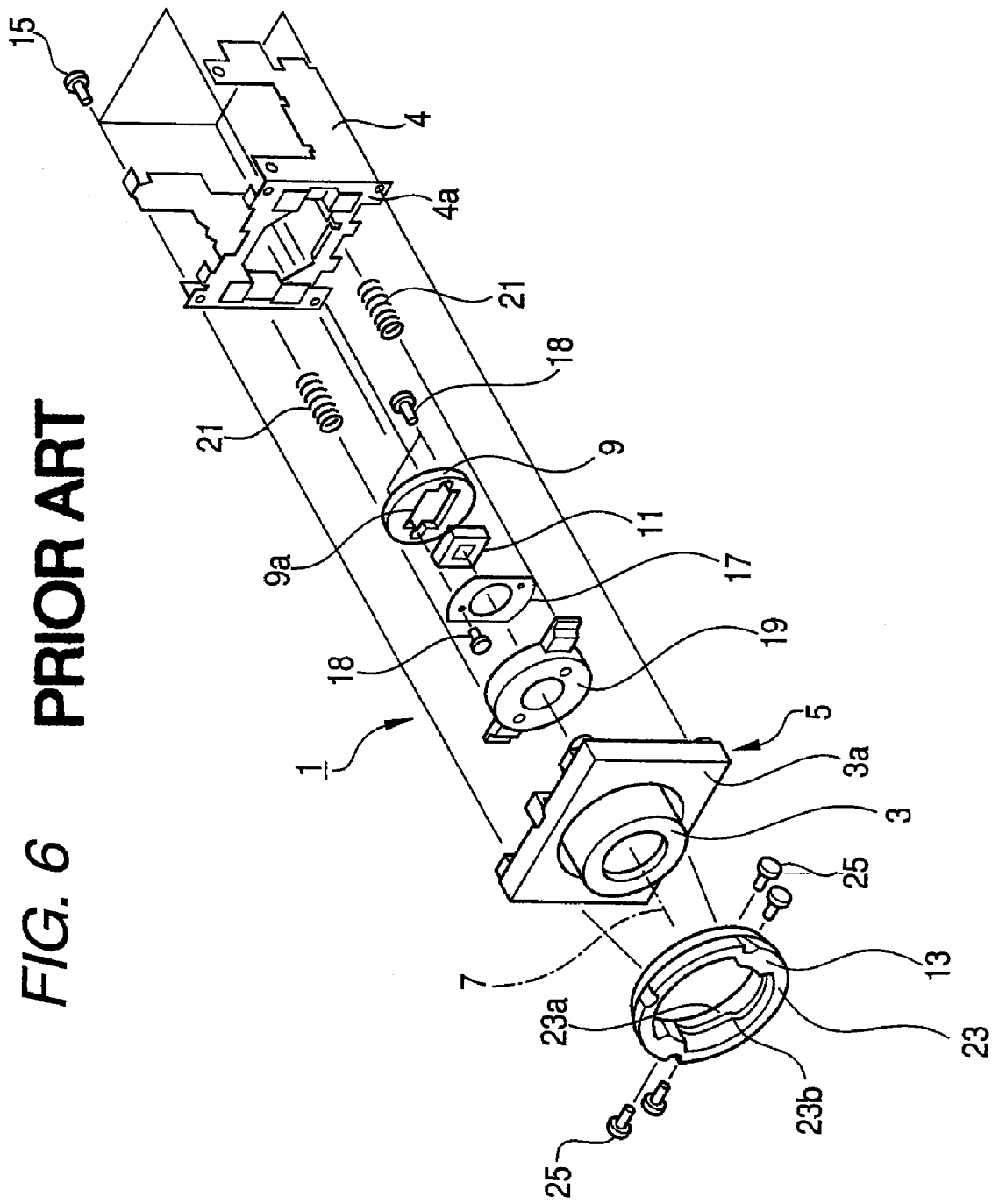
FIG. 6 is an exploded perspective view of main portions of a camera with a flange back adjusting mechanism of the conventional art.
Figure 7:
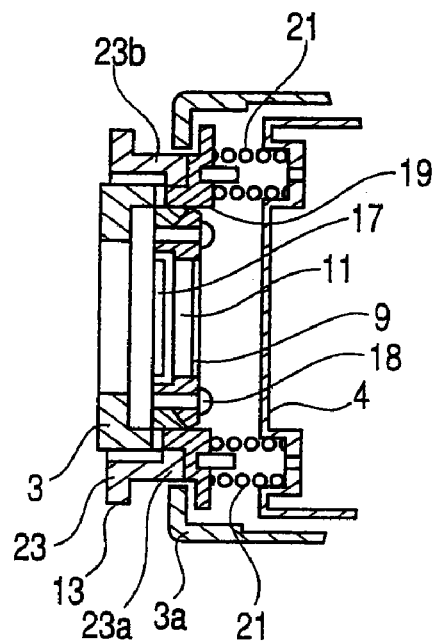
FIG. 7 is a longitudinal section view of a state where components of the camera with a flange back adjusting mechanism shown in FIG. 6 are assembled.
Figure 8:
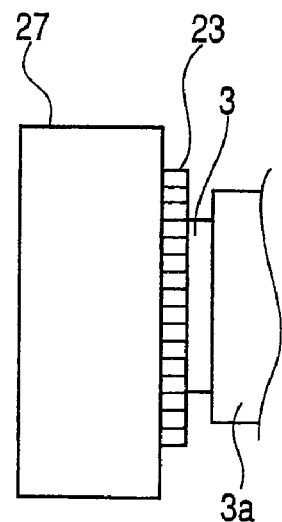
FIG. 8 is a view illustrating a problem in the camera with a flange back adjusting mechanism of the conventional art.

FIGS. 1 to 5 show an embodiment of the camera with a flange back adjusting mechanism of the invention. FIG. 1 is an exploded perspective view of main portions of the camera with a flange back adjusting mechanism, FIG. 2 is a longitudinal section view of a state where a solid state imaging device shown in FIG. 1 is attached to a device holder, FIG. 3 is a longitudinal section view showing a state where components shown in FIG. 1 are assembled, FIG. 4 is a section view taken along the line V-V of FIG. 3, looking in the direction of the arrows, FIG. 5 shows the position of the device holder in accordance with an operation of a flange back adjustment, (a) is a longitudinal section view of a state where the solid state imaging device slightly approaches a lens mount portion, (b) is a longitudinal section view of a state where the solid state imaging device approaches the lens mount portion to the maximum, and (c) is a longitudinal section view of a state where the solid state imaging device separates from the lens mount portion to the maximum.

The camera 31 with a flange back adjusting mechanism is used as a television camera or a video camera, and includes: a camera chassis 40 having a lens mount portion 41 to which a lens is to be mounted and a case portion 42 which is rearward continuous to the lens mount portion 41; a device holder 50 which is supported by the camera chassis 40 so as to be movable in the vicinity of the imaging position of the lens mounted to the lens mount portion 41 and along the direction of the optical axis 33 of the lens; a CCD 61 serving as a solid state imaging device which is held on the optical axis 33 of the lens by the device holder 50, and which converts an incident optical signal into an electric signal and outputs the electric signal; and a flange back adjusting mechanism 70 which moves and adjusts the position of the device holder 50 in the direction of the optical axis of the lens.

In the embodiment, in the camera chassis 40, the cylindrical lens mount portion 41 is formed on a front wall 42a of the case portion 42 having a box-like shape of an integral structure in which the rear side is opened. In the lens mount portion 41, a thread portion to which a lens unit is to be fastened is formed in an inner periphery.

The device holder 50 has a device attaching section 51 which is an opening for attaching the CCD 61, in a center portion through which the optical axis 33 of the lens passes. Coupling pieces 52 which serve as coupling portions for the camera chassis 40 are projected from both sides of the holder, respectively. Each of the coupling pieces 52 has a guide through hole 52a which is to be fitted onto a guide shaft 43 projected from the front wall 42a of the case portion 42. By the fitting of the coupling pieces 52 onto the guide shafts 43, the device holder 50 is coupled to the camera chassis 40 so as to be movable in the direction of the optical axis of the lens.

Retaining rings 54 for locking are fitted onto the tip ends of the guide shafts 43 which are passed through the coupling pieces 52, respectively. Holder urging springs 55 are disposed between the retaining rings 54 and the coupling pieces 52. The device holder 50 is always urged toward the lens mount portion 41 by the holder urging springs 55.

The CCD 61 is attached onto a base plate 62 which serves also as an attachment plate for the device holder 50. Screw through holes 63 are formed in the base plate 62.

The CCD 61 is fastened and fixed to the device holder 50 by screws 65 passing through the screw through holes 63.

In the embodiment, before the CCD 61 is fitted, a seal ring 57 which is made of an elastic material is attached to the device attaching section 51 of the device holder 50.

The seal ring 57 is interposed in a compressed state between the device attaching section 51 of the device holder 50 and the CCD 61, thereby closing a gap between the device holder 50 and the CCD 61.

The flange back adjusting mechanism 70 is configured by: a cam ring 71 which is supported so as to be rotatable about the optical axis of the lens, by fitting with a shaft portion 42b (see FIGS. 4 and 2) formed on the front wall 42a of the camera chassis 40; positioning protrusions 72 which protrude from a front face of the device holder 50, and the tip ends of which butt against cam surfaces 71a of the cam ring 71, respectively; the above-mentioned holder urging springs 55 which urge the device holder 50 toward the cam ring 71 so as to maintain the state where the positioning protrusions 72 butt against the cam surfaces 71a; an operation window 74 which is opened in a side wall face of the camera chassis 40, the side wall face separating rearward from the lens mount portion 41 along the direction of the optical axis and on a peripheral wall of the case portion 42; and a ring driving mechanism 76 which rotates the cam ring 71 by an operation section 75 that protrudes to the outside of the case portion 42 through the operation window 74.

As shown in FIGS. 3 and 4, the cam surfaces 71a of the cam ring 71 are smooth inclined or curved faces in which the projection length in the direction of the optical axis of the lens is gradually changed in the direction of a circumference centered at the optical axis. When the cam ring 71 is rotated, the positions of the cam surfaces 71a where the positioning protrusions 72 are contacted are changed to cause the device holder 50 to be displaced in the direction of the optical axis.

As shown in FIG. 4, rotation limiting pieces 71b and 71c are projected from two places of the outer periphery of the cam ring 71 which are on both sides of a stopper 45 projected from the inner wall face of the camera chassis 40, respectively. A gear 71d which meshes with a driving gear 81 of the ring driving mechanism 76 is formed in a fixed range of the outer peripheral face on the side of the ring driving mechanism 76.

The rotation limiting pieces 71b and 71c butt against the stopper 45 to limit the rotation range of the cam ring 71. The limitation of the rotation range by the rotation limiting pieces 71b and 71c prevents the positioning protrusions 72 from overriding the cam surfaces 71a, and prevents the meshing between the gear 71d in the outer periphery of the cam ring 71 and the driving gear 81 of the ring driving mechanism 76 from being cancelled.

As shown in FIG. 1, the ring driving mechanism 76 is configured by: the driving gear 81 which meshes with the gear 71d of the cam ring 71; a cylindrical shaft 82 which is fixed to the center of the driving gear 81; the operation section 75 which has a substantially semicircular shape, and which is disposed integrally with the shaft 82 to be rotated integrally with the driving gear 81; a support pin 84 which is passed through the shaft 82 so as to rotatably couple the shaft 82 to the camera chassis 40; and a washer 86 and an elastic member 87 which are fittingly mounted to a shaft portion of the support pin 84 so as to be sandwiched between a head 84a of the support pin 84 and the operation section 75.

In the operation section 75, splines which exert an antislip function during a rotating operation are formed in an outer peripheral face which protrudes through the operation window 74.

The elastic member 87 has a ring-like appearance which is similar in shape to the washer, and butts in a compressed state against the operation section 75, so that the elastic restoring force applies to the operation section 75 and the driving gear 81 a load that blocks rotation of the operation section 75 and the driving gear 81 when the rotation operating force is equal to or smaller than a reference.

When the driving gear 81 meshing with the gear 71d of the cam ring 71 is to be rotated by the operation section 75, therefore, the operation section 75 is rotated by an operating force which is equal to or larger than the reference.

When the cam ring 71 is swung in the direction of the arrow (A) as shown in FIG. 5(b) by rotating the operation section 75 from the state where the positioning protrusions 72 butt against intermediate portions of the cam surfaces 71a as shown in FIG. 5(a), the contact positions of the positioning protrusions 72 are moved in the direction to a lower position along the cam surfaces 71a, and the device holder 50 approaches the lens mount portion 41. When the cam ring 71 is swung in the direction of the arrow (B) as shown in FIG. 5(c) by rotating the operation section 75, the contact positions of the positioning protrusions 72 are moved in the direction to a higher position along the cam surfaces 71a, and the device holder 50 separates from the lens mount portion 41.

After the flange back adjustment, the device holder 50 is fixed to a predetermined position by fastening a screw 46 which is screwed into the camera chassis 40.

In the above camera 31 with a flange back adjusting mechanism, the operation section 75 of the flange back adjusting mechanism 70 for moving the device holder 50 is placed in the side wall face of the camera chassis 40 which is rearward separated from the lens mount portion 41. Even when a large aperture interchangeable lens is mounted to the lens mount portion 41, therefore, the operation section 75 does not hide in a valley portion behind the interchangeable lens, and hence the operation of the flange back adjusting mechanism 70 is not obstructed.

Therefore, the operation of adjusting the flange back is easily conducted, and the handleability in the flange back adjustment is improved.

In the embodiment, the ring driving mechanism 76 includes the elastic member 87 which applies to the driving gear 81 a load that blocks rotation of the driving gear 81 when the rotation operating force is equal to or smaller than the reference, and the load which is applied to the driving gear 81 by the elastic member 87 exerts a braking function which prevents rattling of the driving gear 81 and the operation section 75 due to backlash in the gear train used in the flange back adjusting mechanism 70, from occurring. Therefore, an error due to rattling is prevented from being produced in transmission of the operating force, and a highly accurate flange back adjustment is facilitated.

Although the invention has been described in detail and with reference to a specific embodiment, it will be obvious to those skilled in the art that various changes and modification may be made without departing the sprit and scope of the invention.

The application is based on Japanese Patent Application (Patent Application No. 2000-373037) filed on Dec. 7, 2000, and its contents are incorporated herein by reference.

INDUSTRIAL APPLICABILITY

According to the camera with a flange back adjusting mechanism of the invention, the operation section of the flange back adjusting mechanism for moving the device holder is placed on the side face of the camera chassis which is rearward separated from the lens mount portion. Even when an interchangeable lens of a large aperture is mounted to the lens mount portion, therefore, the operation section does not hide in a valley portion behind the interchangeable lens, and the operation of the flange back adjusting mechanism is not obstructed.

Therefore, the operation of adjusting the flange back is easily conducted, and the handleability in the flange back adjustment is improved.

In the camera with a flange back adjusting mechanism, the ring driving mechanism is configured so as to rotate a driving gear which meshes with the cam ring by the operation section, and includes an elastic member which applies to the driving gear a load that blocks rotation of the driving gear when a rotation operating force is equal to or smaller than a reference. According to the configuration, the load which is applied to the driving gear by the elastic member exerts a braking function which prevents rattling of the driving gear and the operation section due to backlash in a gear train used in the flange back adjusting mechanism, from occurring. Therefore, an error due to rattling is prevented from being produced in transmission of the operating force, and a highly accurate flange back adjustment is facilitated.

The invention claimed is:

1. A camera with a flange back adjusting mechanism comprising: a camera chassis having a lens mount portion; a device holder which is supported by said camera chassis to be movable in a vicinity of an imaging position of a lens and in a direction of an optical axis; a solid state imaging device which is held by said device holder; and a flange back adjusting mechanism which moves and adjusts said device holder in the direction of the optical axis, wherein said flange back adjusting mechanism comprises: a cam ring which is supported to be rotatable about the optical axis in said camera chassis, and in which a cam surface is disposed in a peripheral edge portion, a projection length of said cam surface in the direction of the optical axis being gradually changed in a circumferential direction; a positioning protrusion which protrudes from said device holder, a tip end of said protrusion butting against said cam surface; a holder urging spring which urges said device holder toward said cam ring to maintain a state where said positioning protrusion butts against said cam surface; an operation window which is opened in a side wall face of said camera chassis, said side wall face extending along the direction of the optical axis; and a ring driving mechanism which rotates said cam ring by an operation section that protrudes to an outside through said operation window.

2. The camera with a flange back adjusting mechanism according to claim 1, wherein said ring driving mechanism is configured to rotate a driving gear which meshes with said cam ring by said operation section, and comprises an elastic member which applies to said driving gear a load that blocks rotation of said driving gear when a rotation operating force is equal to or smaller than a reference.

* * * * *